(12) United States Patent
Bickel (10) Patent No.: US 6,843,045 B2
(45) Date of Patent: Jan. 18, 2005

(54) HARVESTER PICKUP REEL CONTROLLING THE TINE TIP PATH

(75) Inventor: Donald Wayne Bickel, Peru, IL (US)

(73) Assignee: HCC, Inc., Mendota, IL (US)

( * ) Notice: Subject to any disclaimer, the term of this patent is extended or adjusted under 35 U.S.C. 154(b) by 0 days.

(21) Appl. No.: 10/641,984

(22) Filed: Aug. 15, 2003

(65) Prior Publication Data

US 2004/0139715 A1 Jul. 22, 2004

Related U.S. Application Data

(60) Provisional application No. 60/404,206, filed on Aug. 16, 2002.

(51) Int. Cl.$^7$ .............................................. A01D 34/00
(52) U.S. Cl. ..................................................... 56/14.4
(58) Field of Search ........................ 56/220, 221, 226, 56/219, 222, 223, 224, 225, 227, 364, 120, 130

(56) References Cited

U.S. PATENT DOCUMENTS

| 507,255 | A | | 10/1893 | Benroth |
|---|---|---|---|---|
| 1,035,485 | A | | 8/1912 | Sletto |
| 1,727,709 | A | | 9/1929 | Johnston et al. |
| 1,794,646 | A | | 3/1931 | Schueler |
| 2,388,212 | A | | 10/1945 | McElhoe et al. |
| 2,669,081 | A | | 2/1954 | Weems et al. |
| 2,694,894 | A | | 11/1954 | Linsheid |
| 3,468,109 | A | | 9/1969 | Reimer |
| 3,472,008 | A | * | 10/1969 | Hurlburt ........................ 56/226 |
| 3,546,863 | A | | 12/1970 | Connolly |
| 3,796,030 | A | | 3/1974 | Neal et al. |
| 3,940,910 | A | * | 3/1976 | d'Acremont ................. 56/14.4 |
| 4,008,558 | A | | 2/1977 | Mott |
| 4,067,177 | A | | 1/1978 | Tout |
| 4,156,340 | A | | 5/1979 | Colgan et al. |
| 4,353,201 | A | | 10/1982 | Pierce et al. |
| 4,751,809 | A | | 6/1988 | Fox et al. |
| 5,007,235 | A | * | 4/1991 | Nickel et al. ................. 56/12.4 |
| 5,566,536 | A | * | 10/1996 | Krafka et al. ................. 56/15.2 |
| 5,595,053 | A | | 1/1997 | Jasper et al. |
| 5,768,870 | A | | 6/1998 | Talbot et al. |
| 5,987,861 | A | * | 11/1999 | Duncan et al. ............... 56/14.4 |
| 6,170,244 | B1 | * | 1/2001 | Coers et al. ................... 56/226 |
| 6,502,379 | B1 | * | 1/2003 | Snider .......................... 56/221 |
| 6,591,598 | B2 | * | 7/2003 | Remillard et al. ............. 56/226 |

FOREIGN PATENT DOCUMENTS

EP 0280790 7/1987

* cited by examiner

Primary Examiner—Árpád F+e Kovács
(74) Attorney, Agent, or Firm—Michael Best & Friedrich LLP (57) ABSTRACT

A pickup reel for a harvesting machine comprising a reel support and a first shaft rotatably supported by the reel support and extending along an axis transverse to the frame. A cam is supported by the reel support and defines a generally endless cam path extending about the first shaft. An arm extends radially from the first shaft and is rotatable with the first shaft. A second shaft is connected to the arm and supports a first tine and a second tine located on opposite axial sides of the cam. A cam follower is engageable with the cam and movable along the cam path. A crank arm assembly is connected between the cam follower and the second shaft. The rotation of the first shaft and movement of the cam follower along the cam path cooperate to cause the tips to move along the tip path.

33 Claims, 9 Drawing Sheets

HARVESTER PICKUP REEL CONTROLLING THE TINE TIP PATH

RELATED APPLICATIONS

The present application claims the benefit of prior-filed now abandoned provisional patent application Ser. No. 60/404,206, filed Aug. 16, 2002.

FIELD OF THE INVENTION

The present invention relates to harvesters and, more particularly, to a pickup reel for a harvester.

BACKGROUND OF THE INVENTION

A typical harvester includes a harvesting platform including a frame supported for movement over ground, the frame having a front edge, a cutter bar extending along the front edge, and a pickup reel for lifting crop into the harvester. Generally, a pickup reel includes a reel support supported by the frame, a shaft rotatably supported by the reel support and extending along an axis transverse to the frame, a plurality of arms extending radially from and being rotatable with the shaft, a plurality of second shafts, each supported by at least one of the arms and being generally parallel to and radially spaced from the first shaft, the second shafts being rotatable relative to and rotatable with the arm, and a plurality of tines supported by each second shaft for rotation with the second shaft. The tips of the tines are movable along a tip path during rotation of the first shaft.

In some constructions, the pickup reel may also include an arrangement for defining the tip path. A typical arrangement includes a cam defining a generally endless cam path extending about the first shaft, a cam follower engageable with the cam and movable along the cam path, and a crank arm connected between a cam follower and a second shaft. Rotation of the first shaft and movement of the cam follower along the cam path cooperate to cause the tips to move along the tip path. Exemplary arrangements are illustrated in U.S. Pat. Nos. 5,768,870; 5,595,053; 5,566,536; 5,007,235; and 4,008,558.

SUMMARY OF THE INVENTION

Some of the above-described harvesters and pickup reels include a plurality of tines located axially inwardly of the cam. An axial gap or space may exist between the axially-outermost tine and the cam and between the cam and the end sheet of the header, and, in the gap or space, the tine does not sweep or lift crop into the harvester along this portion of the front edge of the harvester. This may cause problems with crop material being fed to the header auger.

Some of the above-described harvesters and pickup reels includes ends of the second shafts are axially inward of the cam.

Some of the above-described harvesters and pickup reels include second shafts that may be positioned radially inward of the perimeter of cam during a portion of the rotation of the first shaft. Also, at such times, the arms do not extend radially beyond the perimeter of cam.

Some of the above-described harvesters and pickup reels include the cam in relatively close proximity to the path of the second shafts during operation of the pickup reel.

Some of the above-described harvesters and pickup reels include a single crank arm connected between each cam follower and each second shaft, and the configuration of the cam must be optimized to provide the desired tip path for the tines. The cam must be in close proximity to the path of the second shafts to provide the necessary rotation of the second shafts to obtain the desired tip path.

The present invention provides a harvester and a pickup reel. In some aspects of the invention, at least one tine is positioned beyond the outer axial end of the cam. In some aspects, there is a cam on each end of the pickup reel, and at least one tine is positioned beyond the outer axial end of each cam. In some aspects, a pickup reel is provided without a gap or space between the outermost, interior tine and the cam and between the cam and the end sheet of the header to ensure that crop is lifted into the harvester across substantially the entire width of the header (and across the entire length of the front edge of the harvester). In some aspects, the second shafts are positioned beyond the perimeter of the cam, and the path of the second shafts is beyond the perimeter of the cam.

In some aspects, the ends of the arms supporting each second shaft extend radially beyond the perimeter of the cam, and the path of the ends of the arms is beyond the perimeter of the cam. In some aspects, the perimeter of the cam is reduced relative to existing cams. In some aspects, a crank arm assembly, including a plurality of crank arms, is provided between each cam follower and each second shaft. In some aspects, the crank arm assembly provides a parallel, offset linkage between the cam follower and the bat tubes.

More particularly, the present invention provides a pickup reel for a harvester, the harvester including a harvesting platform including a frame having a front edge and a cutter bar extending along the front edge. The pickup reel includes a reel support supported by the frame, a first shaft rotatably supported by the reel support and extending along an axis transverse to the frame, an arm extending radially from and being rotatable with the first shaft, a cam supported by the reel support and defining a generally endless cam path extending about the first shaft, the cam having a first axial side and a second axial side, a second shaft supported by the arm and being generally parallel to and radially spaced from the first shaft, the second shaft being rotatable relative to and rotatable with the arm, and a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft, a cam follower engageable with the cam and movable along the cam path, and a crank arm assembly connected between the cam follower and the second shaft. Rotation of the first shaft and movement of the cam follower along the cam path cooperate to cause the tips to move along the tip path.

The pickup reel may include a first cam having an axially outer first cam side and a second cam having an axially outer second cam side. In some aspects, at least one tine is positioned axially outward of the axially outer first cam side, and at least one tine is positioned axially outward of the axially outer second cam side. In some aspects, the first tine is positioned adjacent the axially outer first cam side, and the pickup reel includes a third tine positioned adjacent the axially outer second cam side.

Preferably, the cam defines a perimeter, and the second shaft is positioned radially outside of the perimeter. The second shaft is preferably rotatable with the arm along a second shaft path, and the second shaft path is radially outside of the cam path. Preferably, the arm has an end supporting the second shaft, and the arm extends radially from the first shaft beyond the perimeter of the cam to the end.

In some aspects, the crank arm assembly includes a first crank arm connected between the cam follower and the arm, a second crank arm connected to the cam follower, and a third crank arm connected between the second crank arm and the second shaft. Rotation of the first shaft, movement of the cam follower along the cam path and movement of the crank arm assembly cooperate to cause the tips to move along the tip path. Preferably, the crank arm assembly includes a four-bar linkage.

Also, the present invention provides a pickup reel for a harvester, the harvester including a harvesting platform including a frame having a front edge and a cutter bar extending along the front edge. The pickup reel includes a reel support supported by the frame, a first shaft rotatably supported by the reel support and extending along an axis transverse to the frame, a cam supported by the reel support and defining a generally endless cam path extending about the first shaft, the cam having a first axial side and a second axial side, a plurality of arms extending radially from and being rotatable with the first shaft, a plurality of second shafts extending generally parallel with the first shaft, each of the plurality of second shafts being supported by at least one of the plurality of arms and being rotatable relative to and rotatable with the at least one of the plurality of arms, a first tine and a second tine supported by each of the plurality of second shafts for rotation with each of the plurality of second shafts, each first tine being positioned adjacent the first axial side of the cam, each second tine being positioned adjacent the second axial side of the cam, each tine having a tip, the tips being movable along a tip path during rotation of the first shaft, a cam follower engageable with the cam and movable along the cam path, a crank arm assembly connected between the cam follower and the second shaft. Rotation of the first shaft and movement of the cam follower along the cam path cooperate to cause the tips to move along the tip path.

In addition, the present invention provides a pickup reel for a harvester, the harvester including a harvesting platform including a frame having a front edge and a cutter bar extending along the front edge. The pickup reel includes a reel support supported by the frame, a first shaft rotatably supported by the reel support and extending along an axis transverse to the frame, an arm extending radially from and being rotatable with the first shaft, a cam supported by the reel support and defining a generally endless cam path extending about the first shaft, the cam having a first axial side and a second axial side, a second shaft supported by the arm and being generally parallel to and radially spaced from the first shaft, the second shaft being rotatable relative to and rotatable with the arm, the second shaft extending from beyond the first axial side of the cam to beyond the second axial side of the cam, and a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft, a cam follower engageable with the cam and movable along the cam path, and a crank arm assembly connected between the cam follower and the second shaft. Rotation of the first shaft and movement of the cam follower along the cam path cooperate to cause the tips to move along the tip path.

Further, the present invention provides a pickup reel for a harvester, the harvester including a harvesting platform including a frame having a front edge and a cutter bar extending along the front edge. The pickup reel includes a reel support supported by the frame, a first shaft rotatably supported by the reel support and extending along an axis transverse to the frame, a cam supported by the reel support and defining a generally endless cam path and a perimeter extending about the first shaft, the cam having a first axial side and a second axial side, an arm extending radially from and being rotatable with the first shaft, the arm having an end and extending radially from the first shaft radially beyond the perimeter of the cam to the end, a second shaft supported by the arm proximate the end and being generally parallel to and radially spaced from the first shaft, the second shaft being rotatable relative to and rotatable with the arm, the second shaft being rotatable with the arm along a shaft path, the shaft path being radially beyond the perimeter of the cam, and a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft, a cam follower engageable with the cam and movable along the cam path, and a crank arm assembly connected between the cam follower and the second shaft. Rotation of the first shaft and movement of the cam follower along the cam path cooperate to cause the tips to move along the tip path.

Also, the present invention provides a pickup reel for a harvester, the harvester including a harvesting platform including a frame having a front edge and a cutter bar extending along the front edge. The pickup reel includes a reel support supported by the frame, a first shaft rotatably supported by the reel support and extending along an axis transverse to the frame, an arm extending radially from and being rotatable with the first shaft, a cam supported by the reel support and defining a generally endless cam path extending about the first shaft, the cam having a first axial side and a second axial side, a second shaft supported by the arm and being generally parallel to and radially spaced from the first shaft, the second shaft being rotatable relative to and rotatable with the arm, and a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft, a cam follower engageable with the cam and movable along the cam path, and a crank arm assembly connected between the cam follower and the second shaft. The crank arm assembly is defined as including a first crank arm connected between the cam follower and the arm, a second crank arm connected to the cam follower, and a third crank arm connected between the second crank arm and the second shaft. Rotation of the first shaft, movement of the cam follower along the cam path, and movement of the crank arm assembly cooperate to cause the tips to move along the tip path.

In addition, the present invention provides a harvester including a harvesting platform including a frame having a front edge, and a cutter bar extending along the front edge, and a cam path pickup reel.

In some aspects of the invention, at least one tine is located axially beyond the outer axial end of the cam. Accordingly, the axial gap between the axially-outermost inner tine and the cam and between the cam and the end sheet of the header is eliminated, and the tines sweep and lift crop into the harvester across the entire width of the header.

In some aspects of the invention, the ends of the second shafts extend axially beyond the cam.

In some aspects of the invention, the second shafts are positioned radially outward of the perimeter of cam and move along a shaft path radially outward of the perimeter of the cam during the rotation of the first shaft. Also, the arms extend radially beyond the perimeter of cam.

In some aspects of the invention, the cam is spaced radially inwardly of the path of the second shafts during operation of the pickup reel.

In some aspects of the invention, because a crank arm assembly including more than one crank arm is connected between each cam follower and each second shaft, the configuration of the cam is simplified to provide the desired tip path for the tines, and the cam may be spaced from the path of the second shafts to provide the necessary rotation of the second shafts while still providing the desired tip path.

Other independent features of the present invention will become apparent to those skilled in the art upon review of the following detailed description and drawings.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 1A:
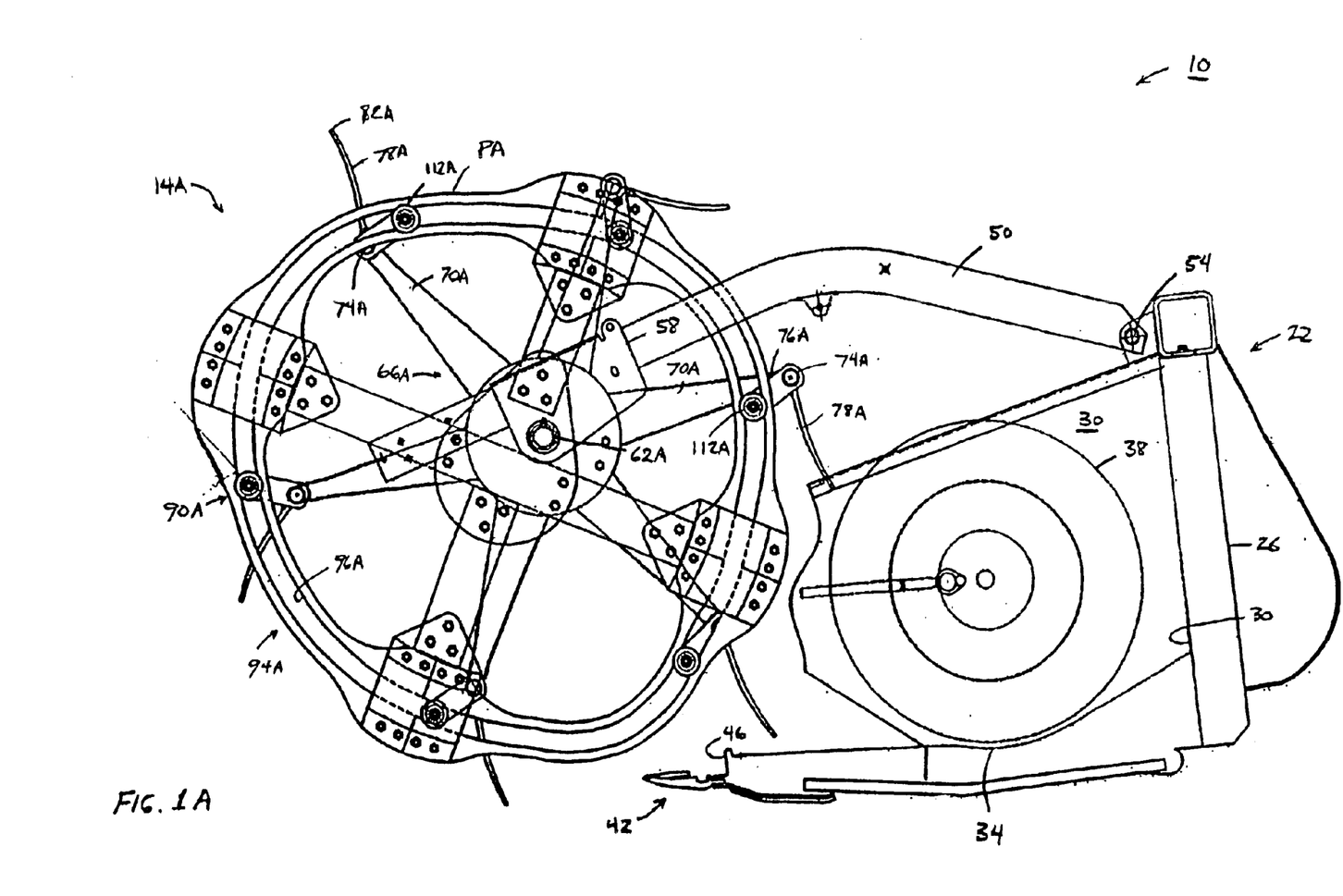
FIG. 1A is a side view of a harvester including a cam path pickup reel.

A harvester 10 including a cam path pickup reel 14A is illustrated in FIG. 1A. The harvester 10 includes a harvesting platform 22 including a platform frame 26 supported for movement over ground and side and rear walls 30. A floor 34 extends between the opposite side walls 30. A transverse crop converging auger 38 is rotatably supported above the floor 34 and forward of the rear wall 30. A transverse cutter bar 42 is mounted along the front edge of the floor 34, and an upright crop dam 46 is supported between the cutter bar 42 and the floor 34.

The pickup reel 14A generally spans the width of the platform 22, forward of the auger 38 and above the cutter bar 42. The pickup reel 14A is connected to the platform 22 by a pair of reel support arms 50 (one shown) which support the pickup reel 14A on the frame 26. In the illustrated construction, the support arms 50 are pivotally connected to the frame 26 at pivot points 54. The support arms 50 are generally above the side walls 30 of the platform 22. Preferably, the support arms 50 are selectively vertically adjustable by a pair of cylinders (not shown) connected between the support arms 50 and the side walls 30.

Movable support structures 58 are supported at the forward ends of each support arm 50. The support structures 58 are generally slidable between forward and rearward positions on the support arms 50, and their movement is controlled by a pair of cylinders (not shown). The support arms 50 and the support structures 58 are adjustably positioned to adjust the position of the pickup reel 14A relative to the platform 22.

A pickup reel 14 embodying the invention is illustrated in FIGS. 2–7. A tubular reel shaft or first shaft 62 is journalled by and extends between the support structures 58. The first shaft 62 is rotatable relative to the support structures 58 about its axis. A plurality of axially-spaced, radially-extending members or spiders 66 are supported on the first shaft 62 for rotation with the first shaft 62. Each spider 66 includes a plurality of radially-extending arms 70 (six in the illustrated construction) which are axially aligned with the arms 70 on adjacent spiders 66 to form sets of arms 70.

A transverse bat tube, rockshaft or second shaft 74 is journalled in the outer ends of each set of arms 70. The second shafts 74 are rotatable with the associated arms 70 and are rotatable relative to the associated radially-extending arms 70. The second shafts 74 span the width of the pickup reel 14 and are generally parallel to and radially spaced from the first shaft 62.

A crank arm assembly 76 (one shown) is connected to the opposite ends of each second shaft 74 to rotate the second shaft 74 about its axis relative to the associated arms 70. A plurality of harvesting tines 78 are connected to each second shaft 74 for rotation with the second shaft 74. Each tine 78 has a tip 82 which is movable along a tip path.

A cam path arrangement 90 defines the tip path. In the illustrated construction, the cam path arrangement 90 is similar to that shown in co-pending U.S. patent application Ser. No. 10/102,164, filed Mar. 20, 2002, which is hereby incorporated by reference.

In the illustrated construction, the pickup reel 14 includes (see FIGS. 2–4) a pair of cams 94 (one shown) supported at each end of the pickup reel 14. In the illustrated construction, the cams 94 control the angular position of the second shafts 74 and the tines 78. Each cam 94 has a first axial outer side and a second axial inner side and defines a cam path 96 and a perimeter P. Also, in the illustrated construction, the perimeter P of the cam 94 is smaller than the perimeter PA of the cam 94A shown in FIG. 1A. It should be understood that, in other constructions (not shown), only a single cam 94 may be used.

Figures 2, 3, 5:
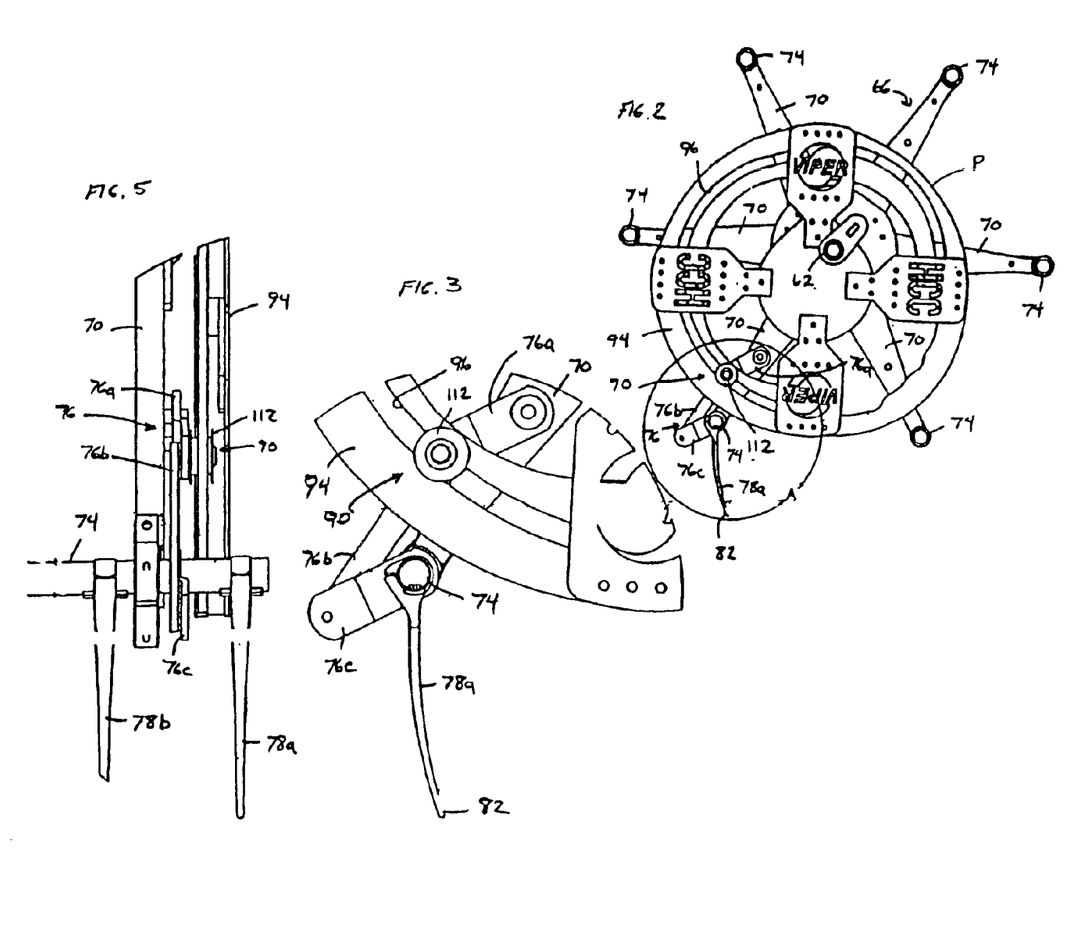
FIG. 2 is a side view similar to that in FIG. 1A and a pickup reel embodying aspects of the invention.
FIG. 3 is a side view of a portion of the pickup reel shown in FIG. 2.
FIG. 5 is a front view of a portion of the pickup reel shown in FIG. 2.

As shown in FIG. 5, in the illustrated construction and in some aspects of the invention, the axial ends (one shown) of each second shaft 74 extend axially to or, preferably, beyond the cam 94 to the axial outer side of the cam 94. At least one axially outer tine 78a is positioned adjacent the axial outer side of the cam 94 (and of both cams 94 if two cams 94 are provided). Other tines 78b are positioned axially inwardly of the cam 94. Therefore, the pickup reel 14 does not have a gap between the outermost, interior tine 78b and the cam 94 and outwardly of the cam 94 to ensure that crop is lifted into the harvester 10 across substantially the entire length of the front edge of the harvester 10.

Figure 1B:
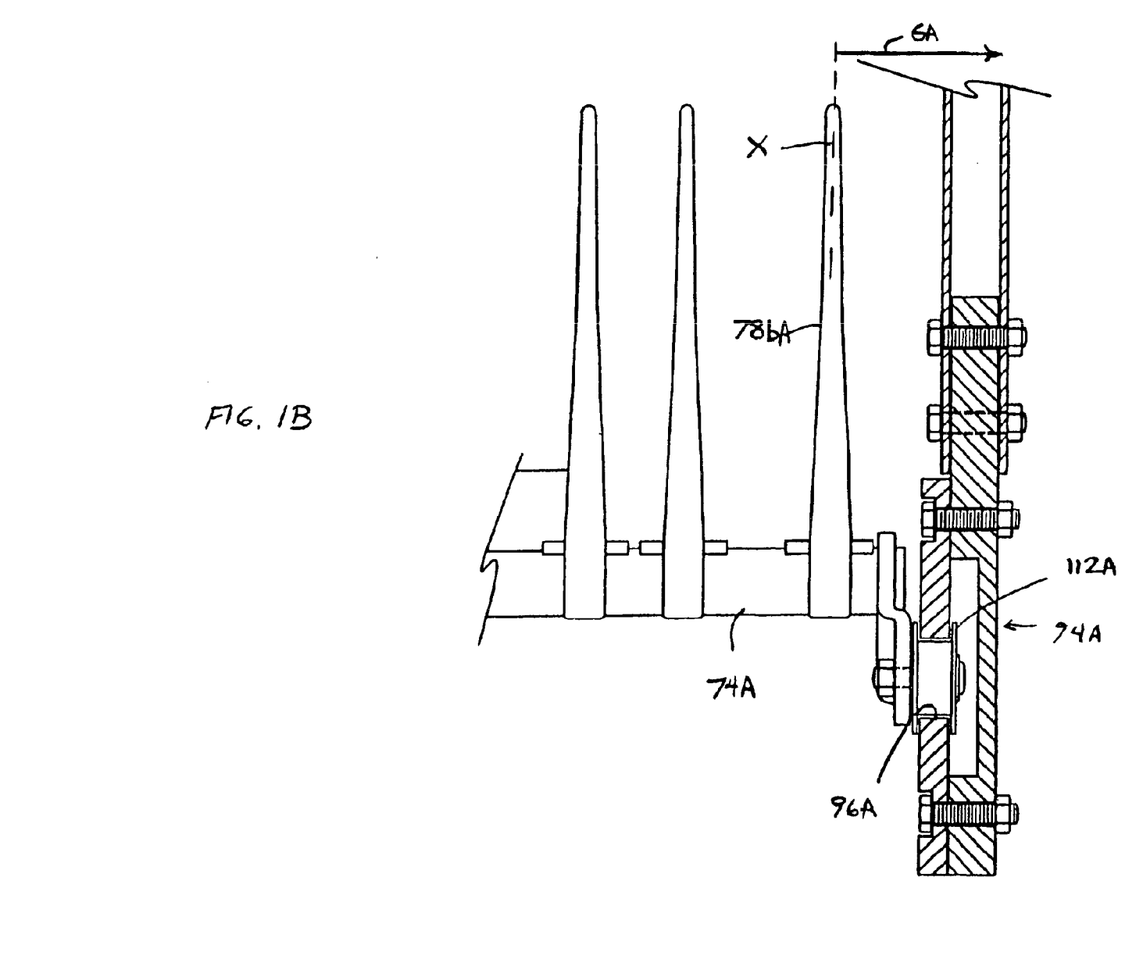
FIG. 1B is a front view of a portion of the pickup reel shown in FIG. 1A.

It should be understood that, in other constructions (not shown), the axially outward tine 78b may be axially inward of the outer axial side of the cam 94 but still be axially outward of the plane X of the outermost tine 78bA on the pickup reel 14A (as shown in FIG. 1B) to thereby eliminate or reduce the axial gap GA. For example, in such other constructions (not shown), the tine 78b may be coplanar with the cam 94 or coplanar with the crank arm assembly 76 such that the axial gap GA is eliminated or reduced.

It should be understood that, in other constructions (not shown), the axially outer tine 78a may be supported outside of the cam 94 in another manner. For example, a separate axially outer second shaft (not shown) may be provided outside of the cam 94. Such an additional second shaft may be supported by an axially outer arm (not shown) on an axial outer spider (not shown) rotatably mounted on the axially outer end of the second shaft 62.

To accommodate the axially-extended second shafts 74, in the illustrated construction (as shown in FIGS. 2–3) and in some aspects of the invention, the end of the arm 70 supporting each second shafts 74 extends radially beyond the perimeter of the cam 94 so that the second shafts 74 are positioned radially outside of the perimeter of the cam 94. The second shafts 74 move along a shaft path which is radially outside of and does not intersect the cam 94.

It should be understood that, in other constructions, the axially-extended second shafts 74 may be accommodated in another manner. For example, a generally circular shaft track (not shown) may be provided in the cam 94 to accommodate movement of the second shafts 74 as the first shaft 62 rotates.

Figure 4:
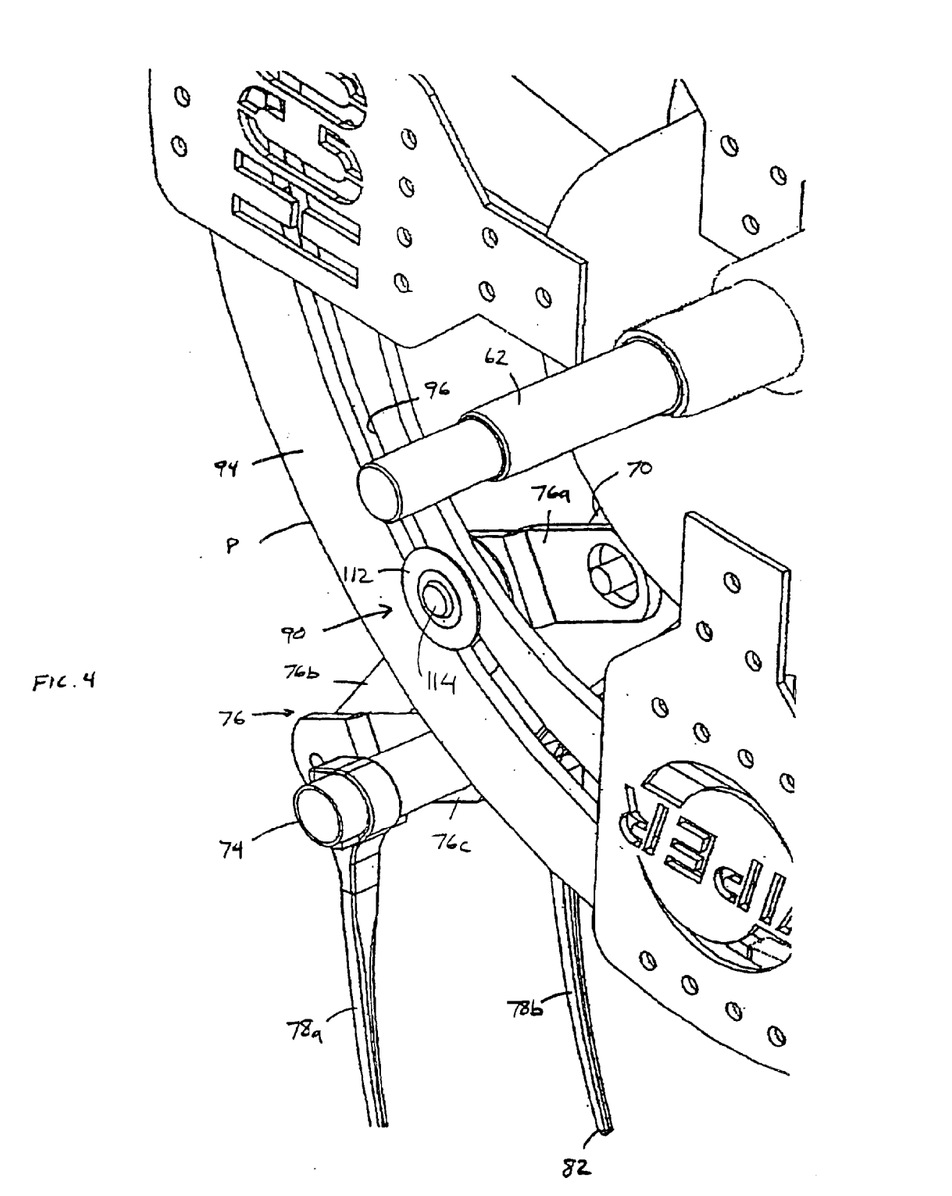
FIG. 4 is a perspective view of a portion of the pickup reel shown in FIG. 2.
Figure 6:
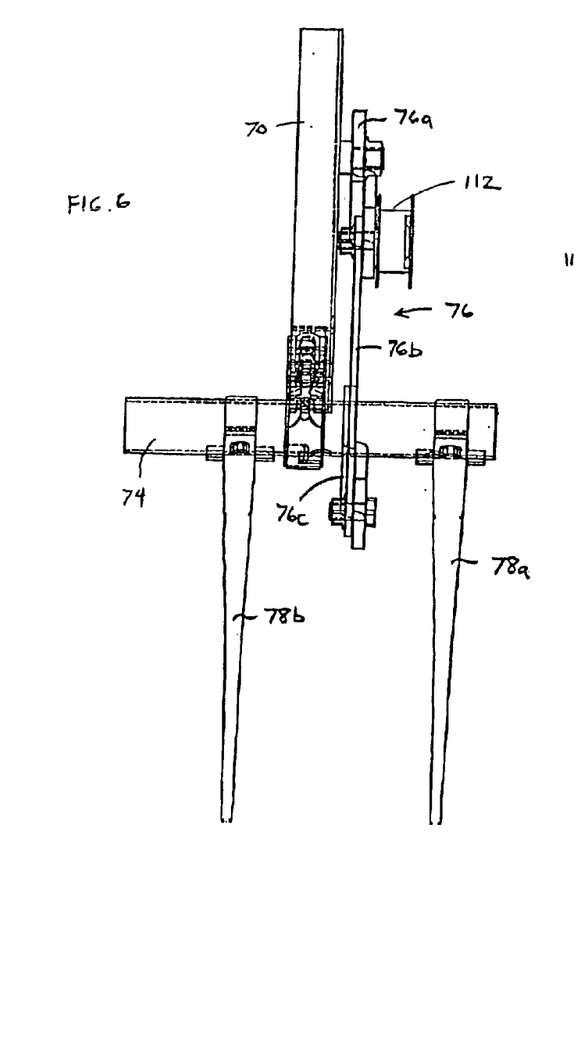
FIG. 6 is a front view of the portion of the pickup reel shown in FIG. 5 with portions removed.
Figure 7:
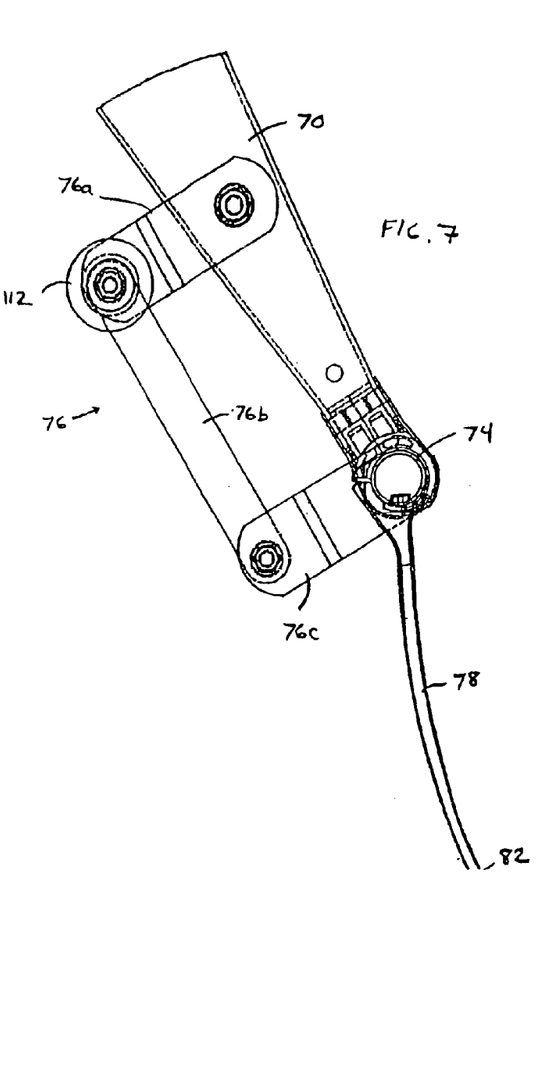
FIG. 7 is a side view of a portion of the pickup reel.
Figure 8:
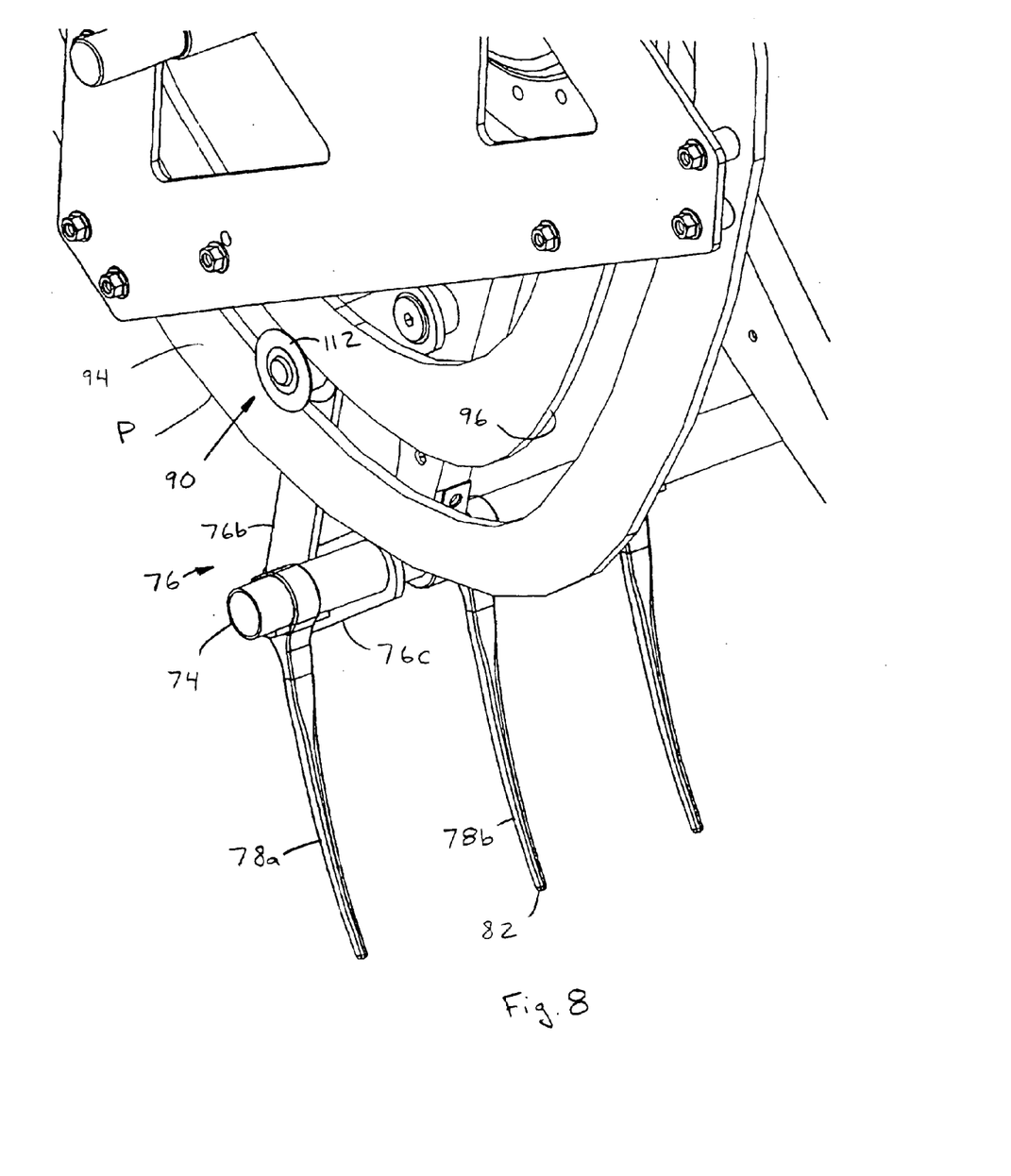
FIG. 8 is a perspective view of a portion a pickup reel embodying aspects of the invention.
Figure 9:
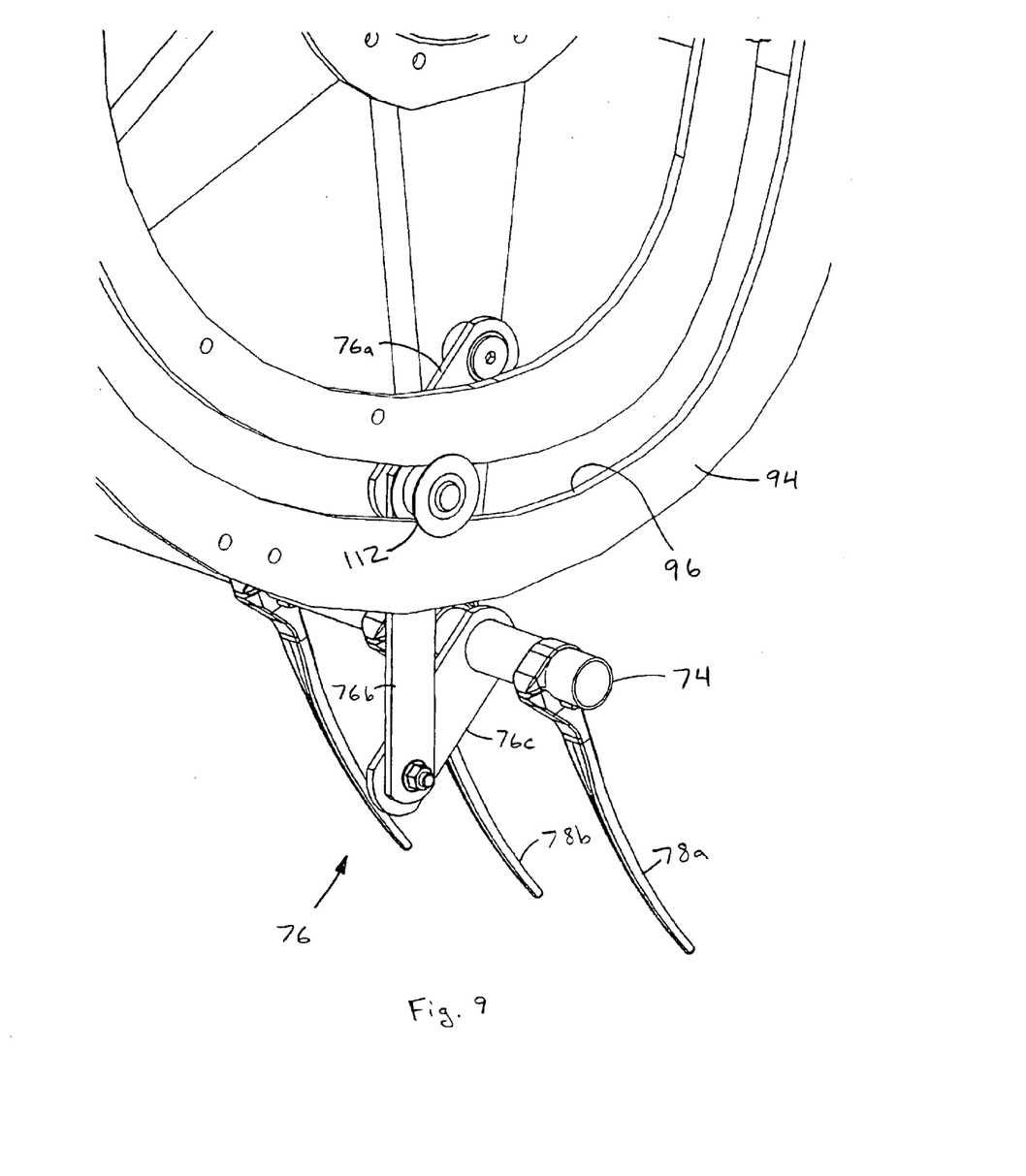
FIG. 9 is a perspective view of a portion of the pickup reel shown in FIG. 8.
Figures 10, 11:
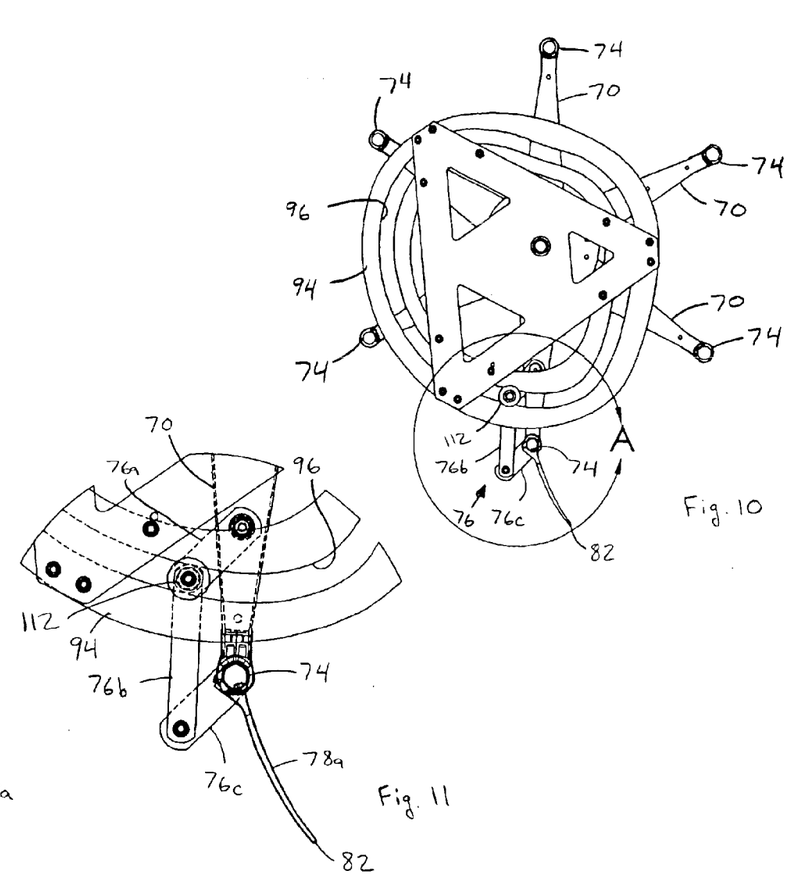
FIG. 10 is a side view of a pickup reel embodying aspects of the invention.
FIG. 11 is a side view of a portion of the pickup reel shown in FIG. 10.
Figure 12:
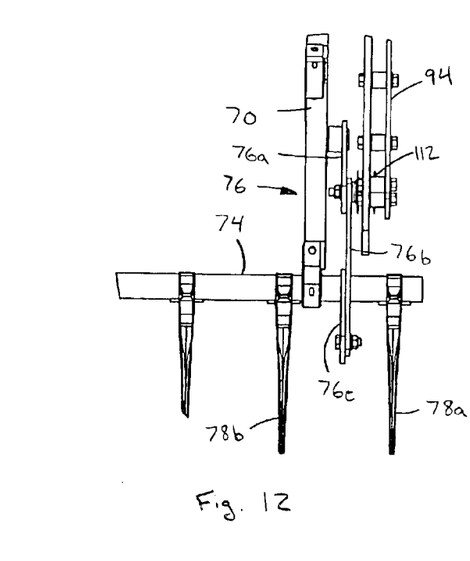
FIG. 12 is a front view of a portion of the pickup reel shown in FIG. 10.
Figure 13:
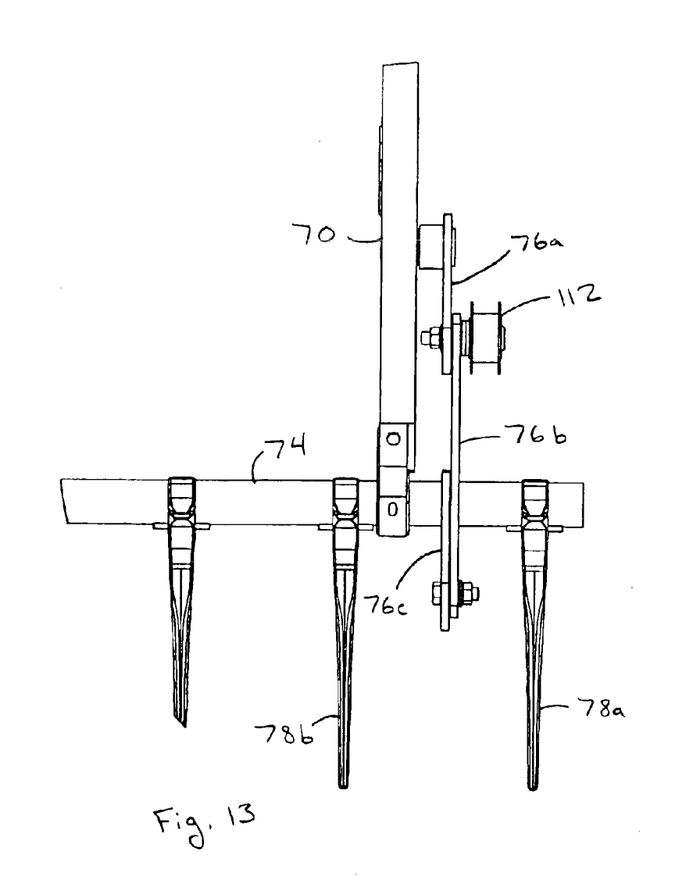
FIG. 13 is a front view of a portion of the pickup reel shown in FIG. 12.
Figure 14:
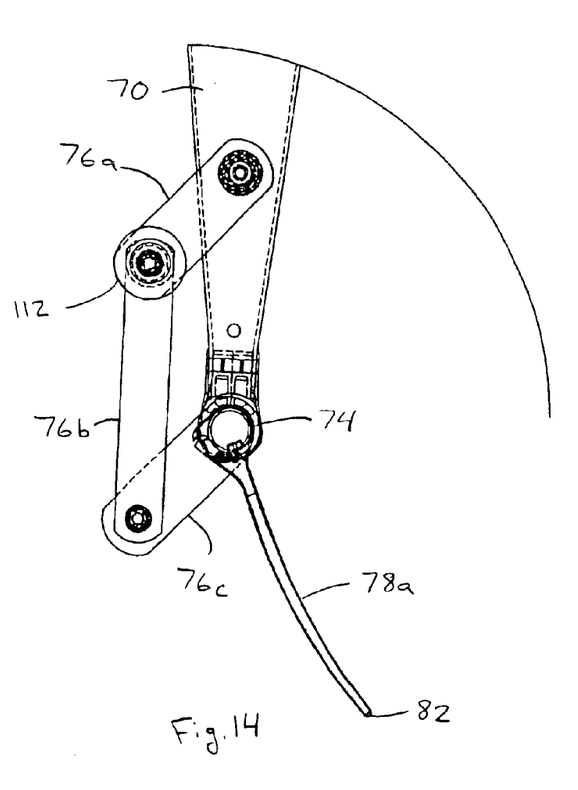
FIG. 14 is a side view of a portion of the pickup reel shown in FIG. 11.

The cam path arrangement 90 also includes a cam follower 112 engageable with the cam 94 and rotatably supported on (see FIGS. 3–5) a cam follower stud 114 connected to each crank arm assembly 76. As shown in FIGS. 2–4, the cam followers 112 are movable along the cam path 96. Rotation of the first shaft 62 and movement of the cam follower 112 along the cam path 96 cooperate to cause the tips 82 to move along the selected tip path. In the illustrated construction, the cam 94 and the cam follower 112 cooperate to provide a cam path arrangement retainer. The retainer prevents unwanted axial movement of the cam follower 112 relative to the cam 94 (i.e., "falling out" of the cam 94).

Each crank arm assembly 76 transfers the motion of the associated cam follower 112 along the cam path 96 to the associated second shaft 74 to provide the desired tip path of the tines 78. In the illustrated construction and in some aspects of the invention, the crank arm assembly 76 includes a parallel, offset four-bar linkage between the cam follower 112 and the second shaft 74.

The crank arm assembly 76 includes a first crank arm 76a pivotally connected between the cam follower 112 and the arm 70, a second crank arm 76b pivotally connected to the cam follower 112, and a third crank arm 76c pivotally connected between the second crank arm 76b and the second shaft 74. As shown in the change of positions of between FIGS. 3 and 7, movement of the cam follower 112 along the cam path 96 varies the pitch of the tines 78 on the second shaft 74 so that, as the first shaft 62 rotates, the tip of the tine 78 moves along the desired tip path.

It should be understood that, in other constructions (not shown), a different crank arm assembly having a different configuration, such as, for example, one or more crank arms, may be provided to transfer the desired motion from the cam follower 112 to the second shaft 74.

The cam path arrangement 90 may be configured to provide any tip path. In the illustrated construction, the cam path arrangement 90 is configured to provide a cam path similar to that shown in co-pending U.S. patent application Ser. No. 10/102,164, filed Mar. 20, 2002, discussed above, and in U.S. Pat. No. 6,170,244, which is also hereby incorporated by reference.

As the pickup reel 14 rotates, movement of the cam follower 112 along the cam path 96 and movement of the crank arm assembly 76 varies the pitch of the tines 78 on the bat tube or second shaft 74. The illustrated cam path arrangement 90 provides for infinitely variable cam paths 96 (one shown) with little or no tooling or replacement parts required. The cam path arrangement 90 provides cam actuated pitch control for the pickup reel 14. The pitch control of the tines 78 is done via the eccentric and, possibly, non-circular cam 94 connected to the bat tube or second shaft 74 through the cam follower 112 connected to the crank arm 76 on each second shaft 74. The cam 94 is preferably stationary.

One or more of the above-identified and other independent features and advantages of the invention are set forth in the claims.

I claim:

1. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

an arm extending radially from and being rotatable with the first shaft;

a second shaft supported by the arm and radially spaced from the first shaft, the second shaft being rotatable relative to and rotatable with the arm;

a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft;

a cam follower engageable with the cam and movable along the cam path; and a crank arm assembly connected between the cam follower and the second shaft, wherein rotation of the first shall and movement of the cam follower along the cam path cooperate to cause the tips to move along the tip path; and wherein the crank arm assembly has a first crank arm pivotally connected between the cam follower and the arm, a second crank arm pivotally connected to the cam follower and extending from the cam follower, and a third crank arm pivotally connected between the second crank arm and the second shaft.

2. The pickup reel as set forth in claim 1 wherein the cam has a cam perimeter, and the arm extends radially beyond the cam perimeter.

3. The pickup reel as set forth in claim 2 wherein the second shaft extends axially beyond the cam.

4. A pickup reel for a harvesting machine, the harvesting machine including a frame having a front edge and a cutterbar extending along the front edge, said reel comprising:
- a reel support supported by the frame;
- a first shaft rotatably supported by the reel support and extending along an axis transverse to the frame;
- a cam supported by the reel support and defining a generally endless cam path extending about the first shaft, the cam having a first axial side and a second axial side;
- an arm extending radially from and being rotatable with the first shaft;
- a second shaft supported by the arm and radially spaced from the first shaft, the second shaft being rotatable relative to and rotatable with the arm;
- a first tine and a second tine supported by the second shaft for rotation with the second shaft, the first tine being located adjacent the first axial side of the cam, the second tine being located adjacent the second axial side of the cam, each of the tines having a tip, the tips being movable along a tip path during rotation of the first shaft;
- a cam follower engageable with the cam and movable along the cam path; and
- a crank arm assembly connected between the cam follower and the second shaft,
- wherein rotation of the first shall and movement of the cam follower along the cam path cooperate to cause the tips to move along the tip path;
- wherein the cam includes an inner cam ring and an outer cam ring spaced radially outwardly of the inner cam ring, the inner cam ring and the outer cam ring defining a cam channel therebetween, the cam follower being movable in the cam channel and along the cam path, the cam follower providing the first surface and the second surface, a portion of at least one of the inner cam ring and the outer cam ring being positioned between the first surface and the second surface to retain the cam follower in engagement with the cam during movement of the cam follower in the cam channel; and
- wherein the cam follower has a first flange portion, a second flange portion spaced axially from the first flange portion, and an intermediate portion positioned between and having a reduced diameter relative to the first flange portion and the second flange portion, at least one of the inner cam ring and the outer cam ring having a cam surface engageable with the intermediate portion axially between the first flange portion and the second flange portion to retain the cam follower in engagement with the cam during movement of the cam follower along the cam path.

5. The pickup reel as set forth in claim 4 wherein the inner cam ring and the outer cam ring are captured between the first flange portion and the second flange portion to retain the cam follower in engagement with the cam during movement of the cam follower along the cam path.

6. The pickup reel as set forth in claim 4 wherein the cam follower is captured between the inner cam ring and the outer cam ring.

7. The pickup reel as set forth in claim 4 wherein the tines have a pitch, wherein the cam has a first portion and a second portion, movement of the cam follower along the first portion of the cam resulting in a first pitch of the tines, movement of the cam follower along the second portion of the cam resulting in a second pitch of the tines.

8. The pickup reel as set forth in claim 4 wherein the cam path is configured to provide a tip path having an approach zone in which the tines extend outward from said reel and the tips move in a generally horizontal path to sweep the ground forward of the cutter bar and a lift zone in which the one of the second shaft rotates in a direction relative to the ground to lift the tips over the cutterbar and above the frame.

9. The pickup reel as set forth in claim 8 wherein the harvesting machine further includes a crop dam rearward of the cutterbar, and wherein, in the lift zone, the tines lift crop over the crop dam.

10. The pickup reel as set forth in claim 8 wherein, in the lift zone, the tips move upward and rearward relative to the cutterbar.

11. The pickup reel as set forth in claim 4 wherein the cam includes a first cam segment and a second cam segment, the first cam segment and the second cam segment being connectable to define the cam path.

12. The pickup reel as set forth in claim 11 wherein one of the first cam segment and the second cam segment is selectively removable and replaceable with a third cam segment, the third cam segment and the other of the first cam segment and the second cam segment being connectable to define a second cam path different than the first-mentioned cam path, the cam follower being movable along the second cam path to cause the tips to move along a second tip path different than the first-mentioned tip path.

13. The pickup reel as set forth in claim 11 wherein one of the first cam segment and the second cam segment forms a crop engagement region of the cam path, the tines being engageable with crop during movement of the cam follower in the crop engagement region of the cam path.

14. A pickup reel for a harvesting machine, the harvesting machine including a frame having a front edge and a cutterbar extending along the front edge, said reel comprising:
- a reel support supported by the frame;
- a first shaft rotatably supported by the reel support and extending along an axis transverse to the frame;
- a cam supported by the reel support and defining a generally endless cam path extending about the first shaft, the cam having a first axial side and a second axial side;
- a plurality of arms extending radially from and being rotatable with the first shaft and extending axially beyond the perimeter of the cam, each of the plurality of arms having an end spaced from the first shaft;
- a plurality of second shafts extending generally parallel with the first shaft, each of the plurality of second shafts being supported by at least one of the plurality of arms and being rotatable relative to and rotatable with at least one of the plurality of arms;
- a first tine and a second tine supported by each of the plurality of second shafts for rotation with each of the plurality of second shafts, each of the tines being located radially outward of the cam, with at least one tine being located axially beyond the cam, each of the tines having a tip, the tips being movable along a tip path during rotation of the first shaft;

a cam follower engageable with the cam and movable along the cam path;

a crank arm assembly connected between the cam follower and the second shaft;

wherein rotation of the first shaft and movement of the cam follower along the cam oath cooperate to cause the tips to move along the tip path; and wherein the crank arm assembly has a first crank arm pivotally connected between the cam follower and the arm, a second crank arm pivotally connected to the cam follower and extending from the cam follower, and a third crank arm pivotally connected between the second crank arm and the second shaft.

15. The pickup reel as set forth in claim 14 wherein the cam has a cam perimeter, and the arm extends radially beyond the cam perimeter.

16. The pickup reel as set forth in claim 15 wherein the second shaft extends axially beyond the cam.

17. The pickup reel as set forth in claim 14 wherein the cam includes an inner cam ring and an outer cam ring spaced radially outwardly of the inner cam ring, the inner cam ring and the outer cam ring defining a cam channel therebetween, the cam follower being movable in the cam channel and along the cam path, the cam follower providing the first surface and the second surface, a portion of at least one of the inner cam ring and the outer cam ring being positioned between the first surface and the second surface to retain the cam follower in engagement with the cam during movement of the cam follower in the cam channel.

18. The pickup reel as set forth in claim 14 wherein the first tine and second tine have a pitch, wherein the cam has a first portion and a second portion, movement of the cam follower along the first portion of the cam resulting in a first pitch of the first tine and second tine, movement of the cam follower along the second portion of the cam resulting in a second pitch of the first tine and second tine.

19. The pickup reel as set forth in claim 14 wherein the cam path is configured to provide a tip path having an approach zone in which the first tine and second tine extend outward from said reel and the tips move in a generally horizontal path to sweep the ground forward of the cutter bar and a lift zone in which the one of the plurality of second shafts rotates in a direction relative to the ground to lift the tips over the cutterbar and above the frame.

20. The pickup reel as set forth in claim 19 wherein the harvesting machine further includes a crop dam rearward of the cutterbar, and wherein, in the lift zone, the tines lift crop over the crop dam.

21. The pickup reel as set forth in claim 19 wherein, in the lift zone, the tips move upward and rearward relative to the cutterbar.

22. The pickup reel as set forth in claim 14 wherein the cam includes a first cam segment and a second cam segment, the first cam segment and the second cam segment being connectable to define the cam path.

23. The pickup reel as set forth in claim 22 wherein one of the first cam segment and the second cam segment is selectively removable and replaceable with a third cam segment, the third cam segment and the other of the first cam segment and the second cam segment being connectable to define a second cam path different than the first-mentioned cam path, the cam follower being movable along the second cam path to cause the tips to move along a second tip path different than the first-mentioned tip path.

24. The pickup reel as set forth in claim 22 wherein one of the first cam segment and the second cam segment forms a crop engagement region of the cam path, the first tine and second tine being engageable with crop during movement of the cam follower in the crop engagement region of the cam path.

25. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

a plurality of arms extending radially from and being rotatable with the first shaft and extending axially beyond the perimeter of the cam, each of the plurality of arms having an end spaced from the first shaft;

a plurality of second shafts extending generally parallel with the first shaft, each of the plurality of second shafts being supported by at least one of the plurality of arms and being rotatable relative to and rotatable with at least one of the plurality of arms;

a first tine and a second tine supported by each of the plurality of second shafts for rotation with each of the plurality of second shafts, each of the tines being located radially outward of the cam, with at least one tine being located axially beyond the cam, each of the tines having a tip, the tips being movable along a tip path during rotation of the first shaft;

a cam follower engageable with the cam and movable along the cam path;

a crank arm assembly connected between the cam follower and the second shaft;

wherein rotation of the first shall and movement of the cam follower along the cam path cooperate to cause the tips to move along the tip path;

wherein the cam has a cam perimeter, and the arm extends radially beyond the cam perimeter; and wherein the cam follower has a first flange portion, a second flange portion spaced axially from the first flange portion, and an intermediate portion between the first flange portion and the second flange portion, the intermediate portion having a reduced diameter, at least one of the inner cam ring and the outer cam ring having a cam surface engageable with the intermediate portion axially between the first flange portion and the second flange portion to retain the cam follower in engagement with the cam during movement of the cam follower along the cam path.

26. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

a plurality of arms extending radially from and being rotatable with the first shaft and extending axially beyond the perimeter of the cam, each of the plurality of arms having an end spaced from the first shaft;

a plurality of second shafts extending generally parallel with the first shaft, each of the plurality of second shafts being supported by at least one of the plurality of arms and being rotatable relative to and rotatable with at least one of the plurality of arms;

a first tine and a second tine supported by each of the plurality of second shafts for rotation with each of the plurality of second shafts, each of the tines being located radially outward of the cam, with at least one tine being located axially beyond the cam, each of the tines having a tip, the tips being movable along a tip path during rotation of the first shaft;

a cam follower engageable with the cam and movable along the cam path;

a crank arm assembly connected between the cam follower and the second shaft;

wherein rotation of the first shaft and movement of the cam follower along the cam path cooperate to cause the tips to move along the tin path;

wherein the cam has a cam perimeter, and the arm extends radially beyond the cam perimeter;

wherein the second shaft extends axially beyond the cam; and wherein the inner cam ring and the outer cam ring are captured between the first flange portion and the second flange portion to retain the cam follower in engagement with the cam during movement of the cam follower along the cam path.

27. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

a plurality of arms extending radially from and being rotatable with the first shaft and extending axially beyond the perimeter of the cam, each of the plurality of arms having an end spaced from the first shaft;

a plurality of second shafts extending generally parallel with the first shaft, each of the plurality of second shafts being supported by at least one of the plurality of arms and being rotatable relative to and rotatable with at least one of the plurality of arms;

a first tine and a second tine supported by each of the plurality of second shafts for rotation with each of the plurality of second shafts, each of the tines being located radially outward of the cam, with at least one tine being located axially beyond the cam, each of the tines having a tip, the tips being movable along a tip path during rotation of the first shaft;

a cam follower engageable with the cam and movable along the cam path;

a crank arm assembly connected between the cam follower and the second shaft;

wherein rotation of the first shaft and movement of the cam follower along the cam path cooperate to cause the tins to move along the tip path;

wherein the cam has a cam perimeter, and the arm extends radially beyond the cam perimeter;

wherein the second shaft extends axially beyond the cam; and wherein the cam follower is captured between the inner cam ring and the outer cam ring.

28. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

an arm extending radially from and being rotatable with the first shaft;

a second shaft supported by the arm and radially spaced from the first shaft, the second shaft being rotatable relative to and rotatable with the arm, and the second shaft extending axially from beyond the first axial side of the cam to beyond the second axial side of the cam;

a first tine and a second tine supported by the second shaft for rotation with the second shaft, the first tine being located adjacent the first axial side of the cam, the second tine being located adjacent the second axial side of the cam, each of the tines having a tin, the tips being movable along a tip path during rotation of the first shaft;

a cam follower engageable with the cam and movable along the cam path; and a crank arm assembly connected between the cam follower and the second shaft, wherein rotation of the first shaft and movement of the cam follower along the cam path cooperate to cause the tips to move along the tip path; and wherein the crank arm assembly has a first crank arm pivotally connected between the cam follower and the arm, a second crank arm pivotally connected to the cam follower and extending from the cam follower, and a third crank arm pivotally connected between the second crank arm and the second shaft.

29. The pickup reel as set forth in claim 28 wherein the cam has a cam perimeter, and the arm extends radially beyond the cam perimeter.

30. A pickup reel for a harvesting machine, the harvesting machine including a frame having a front edge and a cutterbar extending along the front edge, said reel comprising:

a reel support supported by the frame;

a first shaft rotatably supported by the reel support and extending along an axis transverse to the frame;

a cam supported by the reel support and defining a generally endless cam path extending about the first shaft, the cam having a first axial side and a second axial side;

an arm extending radially from and being rotatable with the first shaft, the arm extending axially beyond the perimeter of the cam;

a second shaft supported by the arm and radially spaced from the first shaft, the second shaft being rotatable relative to and rotatable with the arm;

a first tine and a second tine supported by the second shaft for rotation with the second shaft, each of the tines having a tip, the tips being movable along a tip path during rotation of the first shaft;

a cam follower engageable with the cam and movable along the cam path; and a crank arm assembly connected between the cam follower and the second shaft, the crank arm assembly having a first crank arm pivotally connected between the cam follower and the arm, a second crank arm pivotally connected to the cam follower and extending from the cam follower, and a third crank arm pivotally connected between the second crank arm and the second shaft, wherein rotation of the first shaft and movement of the cam follower along the cam path cooperate to cause the tips to move along the tip path.

31. The pickup reel as set forth in claim 30 wherein the cam has a cam perimeter, and the arm extends radially beyond the cam perimeter.

32. The pickup reel as set forth in claim 31 wherein the second shaft extends axially beyond the cam.

33. The pickup reel as set forth in claim 30 wherein the first tine is located adjacent the first axial side of the cam, the second tine located adjacent the second axial side of the cam.

* * * * *